United States Patent
Mestanov et al.

(10) Patent No.: US 10,499,440 B2
(45) Date of Patent: Dec. 3, 2019

(54) WIRELESS COMMUNICATIONS INVOLVING A FAST INITIAL LINK SETUP, FILS, DISCOVERY FRAME FOR NETWORK SIGNALING

(71) Applicant: Telefonaktiebolaget L M Ericsson (publ), Stockholm (SE)

(72) Inventors: Filip Mestanov, Sollentuna (SE); Stephen Rayment, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 308 days.

(21) Appl. No.: 14/655,273

(22) PCT Filed: Jun. 11, 2015

(86) PCT No.: PCT/SE2015/050679
§ 371 (c)(1),
(2) Date: Jun. 24, 2015

(87) PCT Pub. No.: WO2016/130063
PCT Pub. Date: Aug. 18, 2016

(65) Prior Publication Data
US 2016/0374118 A1      Dec. 22, 2016

Related U.S. Application Data

(60) Provisional application No. 62/115,191, filed on Feb. 12, 2015.

(51) Int. Cl.
*H04W 4/00* (2018.01)
*H04W 76/10* (2018.01)
(Continued)

(52) U.S. Cl.
CPC ......... *H04W 76/10* (2018.02); *H04L 63/0853* (2013.01); *H04L 63/205* (2013.01);
(Continued)

(58) Field of Classification Search
CPC ... H04W 76/023; H04W 24/02; H04W 48/16; H04W 8/005; H04W 88/06
(Continued)

(56) References Cited

U.S. PATENT DOCUMENTS

2013/0177002 A1* 7/2013 Sun ...................... H04W 48/12
370/338
2013/0230035 A1   9/2013 Grandhi et al.
(Continued)

FOREIGN PATENT DOCUMENTS

CN      104041098 A     9/2014
CN      104254983 A    12/2014
(Continued)

OTHER PUBLICATIONS

Aboba, B. et al., "RADIUS (Remote Authentication Dial In User Service) Support for Extensible Authentication Protocol (EAP)", Network Working Group, Request for Comments: 3579, Sep. 2013, 1-46.
(Continued)

*Primary Examiner* — Atique Ahmed
(74) *Attorney, Agent, or Firm* — Murphy, Bilak & Homiller, PLLC

(57) ABSTRACT

The proposed technology relates to the procedure of generating a Fast Initial Link Setup, FILS, Discovery frame (1400) including Mobility Domain information (1401) and/or the exchange of such a frame between a network node and a wireless communication device, e.g. to enable the wireless communication device to determine whether to associate with the network node through a full authentication procedure or through a reduced authentication procedure.

20 Claims, 17 Drawing Sheets

(51) Int. Cl.
  *H04W 12/06* (2009.01)
  *H04W 36/14* (2009.01)
  *H04W 8/00* (2009.01)
  *H04W 8/02* (2009.01)
  *H04L 29/06* (2006.01)
  *H04W 48/12* (2009.01)
  *H04W 12/00* (2009.01)
  *H04W 48/00* (2009.01)

(52) U.S. Cl.
  CPC ............ *H04W 8/005* (2013.01); *H04W 8/02* (2013.01); *H04W 12/003* (2019.01); *H04W 12/06* (2013.01); *H04W 36/14* (2013.01); *H04W 48/12* (2013.01); *H04W 48/17* (2013.01)

(58) Field of Classification Search
  USPC .......................................... 370/328
  See application file for complete search history.

(56) References Cited

U.S. PATENT DOCUMENTS

| | | | | |
|---|---|---|---|---|
| 2013/0279438 | A1* | 10/2013 | Kwon | H04W 72/0406 370/329 |
| 2013/0301607 | A1* | 11/2013 | McCann | H04W 36/0072 370/331 |
| 2014/0003282 | A1 | 1/2014 | Kafle et al. | |
| 2014/0010223 | A1* | 1/2014 | Wang | H04W 48/12 370/338 |
| 2014/0064128 | A1* | 3/2014 | Park | H04W 48/12 370/252 |
| 2014/0329498 | A1* | 11/2014 | Cherian | H04W 12/06 455/411 |
| 2015/0282064 | A1* | 10/2015 | Patil | H04W 48/20 370/329 |
| 2015/0282157 | A1* | 10/2015 | Kim | H04W 48/14 370/329 |
| 2016/0127903 | A1* | 5/2016 | Lee | H04W 84/12 713/171 |

FOREIGN PATENT DOCUMENTS

| | | |
|---|---|---|
| KR | 20140131585 A | 11/2014 |
| RU | 2013127249 A | 12/2014 |
| WO | 2014008238 A1 | 1/2014 |
| WO | 2014069870 A1 | 5/2014 |

OTHER PUBLICATIONS

Haverinen, H. et al., "Extensible Authentication Protocol Method for Global System for Mobile Communications (GSM) Subscriber Identity Modules (EAP-SIM)", Network Working Group, Request for Comments: 4186, Jan. 2006, 1-92.
Wang, Lei, "Discussions about 802.11ai FILS Discovery (FD) Frame Content Design", IEEE 11.12.1030.00.00ai, Sep. 2012, 1-41.
Harkins, Dan et al., "IEEE P802.11 Wireless LANs", IEEE 802.11-15/0162r3, Jan. 14, 2015, 1-6.
Aboba, Bernard et al., "RADIUS Attributes for IEEE 802 Networks draft-ietf-radext-ieee802ext-00.txt", Internet Engineering Task Force, Network Working Group, Internet Draft, Apr. 2, 2012, 1-18.
Ye, C. et al., "Problem statement of key distribution for 802.11 r using CAPWAP protocol draft-ye-capwap-fbsskey-distribution-ps-00.txt", Internet Engineering Task Force, Network Working Group, Internet Draft, Dec. 2006, 1-13.
Lee, Soo Bum, et al., "IEEE P802.11 Wireless LANS", IEEE 802.11-14-1473-01-00ai, Nov. 2014, pp. 1-8.
Wang, Xiaofei, et al., "IEEE P802.11 Wireless LANS", IEEE 802.11-15/0021r20, Jan. 2015, pp. 1-6.

* cited by examiner

| Order | Information | Notes |
|---|---|---|
| 1 | Category | |
| 2 | Public Action | |
| 3 | FILS Discovery Information field | |
| 4 | Reduced Neighbor Report element | Reduced Neighbor Report element is optionally present. |
| 5 | FILS Indication element | The FILS Indication element is optionally present. |
| 6 | Vendor Specific element | One or more Vendor Specific elements are optionally present. |

| Order | Information | Notes |
|---|---|---|
| 1 | Category | |
| 2 | Public Action | |
| 3 | FILS Discovery Information field | |
| 4 | Reduced Neighbor Report element | Reduced Neighbor Report element is optionally present. |
| 5 | FILS Indication element | The FILS Indication element is optionally present. |
| 6  1401 | Mobility Domain Information | |
| 7 | Vendor Specific element | One or more Vendor Specific elements are optionally present. |

*Fig. 13*

| Octets: | Element ID | Length | OI | Type | Mobility Domain Information |
|---|---|---|---|---|---|
| | 1 | 1 | 3 | 1 | variable |

Fig. 14

WIRELESS COMMUNICATIONS INVOLVING A FAST INITIAL LINK SETUP, FILS, DISCOVERY FRAME FOR NETWORK SIGNALING

TECHNICAL FIELD

The proposed technology generally concerns wireless communications and mobility in a wireless communications network, and more specifically a method for assisting a wireless communication device in determining an association procedure towards a network node in a wireless communications network, and a method for determining an association procedure towards a network node, a method of generating a frame for wireless communication, a Fast Initial Link Setup, FILS, Discovery frame for network signaling as well as corresponding network nodes, wireless devices, arrangements and computer programs and computer-program products.

BACKGROUND

Wireless communications is growing at an ever-increasing rate, and there is a wide range of wireless communications technologies including wide range wireless communication and local area communication technologies.

For example, Wireless Local Area Network, WLAN, technology offers a basis for wireless communications within a local area coverage. In general, the WLAN technology includes industry-specific solutions as well as proprietary protocols, although most commercial applications are based on well-accepted standards such as the various versions of IEEE 802.11, also popularly referred to as Wi-Fi.

A WLAN is a wireless network that links two or more devices using a wireless distribution method, often spread-spectrum or OFDM radio, within a limited area such as a home, school, computer laboratory, or office building. This gives users the ability to move around within a local coverage area and still be connected to the network, and may provide a connection to the wider Internet. As mentioned, most modern WLANs are based on the IEEE 802.11 standards, usually marketed under the Wi-Fi brand name.

In the particular example of IEEE 802.11, also referred to as Wi-Fi, terminology, a STAtion, STA, is a device that has the capability to use the 802.11 protocol. For example, an STA may be a laptop, a desktop PC, PDA, access point or Wi-Fi phone. An STA may be fixed, mobile or portable. Generally in wireless networking terminology, a station, wireless client and node are often used interchangeably, with no strict distinction existing between these terms. A station may also be referred to as transmitter or a receiver based on its transmission characteristics. IEEE 802.11-2007 formally defines station as: Any device that contains an IEEE 802.11-conformant Media Access Control, MAC, and PHYsical layer, PHY, interface to the wireless medium.

A Basic Service Set, BSS, is a set of all stations that can communicate with each other. More specifically, a BSS provides the basic building-block of an 802.11 WLAN and is defined by an Access Point, AP, together with all associated stations, STAs.

An Access Point, AP, is a device that allows wireless communication devices to connect to a wired network using Wi-Fi, or related standards.

Initial Connection to a WLAN Network

When a STA connects to a WLAN network, i.e. to a WLAN AP, for the first time, it carries out a procedure similar to the one depicted in FIG. 1.

The authentication procedure comprises the following steps:

1 The STA receives a Beacon frame revealing, among other parameters, the security features associated with the ESS the AP belongs to. The format of the beacon frame as well as all the information elements it carries are described in Chapter 8.3.3.2 of IEEE 802.11, [1];
2 If the STA does not receive a Beacon frame for some reason, it may generate a Probe Request and send it to the AP. This procedure is called active scanning and by performing it, the STA may receive from the AP the same information as it would have from a Beacon message;
3 The AP answers with Probe Response;
a. NOTE: The discovery procedure consists of either step 1 or steps 2 and 3 (i.e., receiving a Beacon frame and exchanging probe messages are mutually exclusive);
4 The STA sends an Open System Authentication Request;
5 The AP responds with an Open System Authentication Response;
6 The STA then sends an Association Request, indicating the security parameters to be used later;
7 The AP responds with an Association Response
a. NOTE: The Open System Authentication does not provide any security. The connection between the STA and the AP is secured at a later point, by means of Authentication and Key Agreement procedure. Nevertheless, a possible attack altering the security parameters in the Open System Authentication message exchange will be detected at the stage of key derivation;
8 At this point the Open System Authentication is completed and the STA may communicate only with the AP—the rest of the traffic is blocked by the port-based network control (PBNC) enforcer, as defined in IEEE 802.1X. Some of the traffic towards external hosts, however, may be forwarded by the AP, as in the case of the communication with the RADIUS server;
9 This step is the first step of the EAP-SIM authentication RFC 4186, [2]. The AP encapsulates an EAP-Request of Type 18 (SIM) inside an EAPOL frame, asking the STA to report its identity. In the case when the STA is equipped with a SIM, the identity is the IMSI, followed by the "@" sign and the home realm. It is also possible for the STA to include an additional "1" in front of the IMSI in order to indicate preference for the exclusive use of EAP-SIM if other EAP methods are available (e.g., EAP-AKAe);
10 The STA responds with its identity. An example of such is: 1234580123000100@wlan.mnc048.mcc264.3gppnetwork.org (and IMSI is in this example 234580123000100 and the preceding "1" indicates the preference to use EAP-SIM);
11 The AP extracts the EAP-Response message, encapsulates it in a RADIUS frame and forwards it to the backend AAA server. The handling of EAP frames over RADIUS is described by the IETF in RFC 3579, [3];
12 The AAA server recognizes the EAP method and sends an EAP-Request/SIM/Start, indicating that an EAP-SIM procedure has been initiated for that Supplicant. It also includes the list of supported SIM versions in the message as described in Chapter 10.2 of RFC 4186, [2];
13 The AP relays the EAP-Request/SIM/Start message to the STA;
14 The STA responds with EAP-Response/SIM/Start message, which carries a random number (NONCE_MT) carried in the AT_NONCE_MT attribute (a randomly selected number), as well as the selected EAP-SIM version (AT_SELECTED_VERSION);

15 The AP forwards the EAP-Response/SIM/Start to the AAA server;
16 The AAA server obtains the GSM triplet (RAND, SRES and Kc) from the HLR/AuC and derives the keying material as specified in Chapter 7 of RFC 4186, [2]. The GSM triplet consists of:
a. RAND—a 128-bit random number, generated by the Authentication Center (an entity within the GSM core network, used to authenticate subscribers at the point of initial attach) when a subscriber authentication is requested. Its use is for the derivation of the Signed Response (SRES) and the Kc;
b. SRES—a 32-bit variable, the expected response from the mobile station/STA after it has been challenged with the RAND;
c. Kc—a 64-bit ciphering key, used to encipher and decipher data transmitted between the STA and the AP;
17 The AAA generates an EAP-Request/SIM/Challenge message, including RAND challenges and message authentication code attribute (AT_MAC). The AT_MAC derivation is based on the RAND and Kc values;
18 The AP forwards the EAP-Request/SIM/Challenge message to the STA;
19 The STA feeds the received RAND into the GSM algorithms running on the SIM and the output is a copy of the AT_MAC and a SRES value. The first thing for the STA to do is to check whether the AT_MAC value received by the AAA (relayed by the AP) and the one generated by the SIM match. If so the STA continues with the authentication, otherwise it responds with an EAP-Response/SIM/Client-Error message. The second thing is to derive a new AT_MAC, based on the generated SRES;
20 The new AT_MAC is sent to the AAA server (via the AP) in an EAP-Response/SIM/Challenge message;
21 The AP forwards the EAP-Response/SIM/Challenge to the AAA server;
22 The AAA server verifies the new AT_MAC value that the STA has just sent. If the verification is successful, it sends an EAP-Success message to the AP. The message also carries keying material—Pairwise Master Key (PMK). The PMK is intended for the AP only and it is not forwarded to the STA (the STA may derive the same key autonomously since it is based on the Kc, which the SIM in the STA may compute based on the RAND);
23 The AP forwards the EAP-Success message to the STA and stores the PMK for the following Four-way handshake;
24 The AP uses the PMK to generate an Authenticator nonce (ANonce);
The ANonce value is sent to the STA in an EAPOL-Key message;
26 Using the received ANonce (together with the SNonce and the PMK), the STA constructs the Pairwise Temporal Key (PTK);
27 The STA sends an EAPOL-Key message to the AP, including a Supplicant nonce (SNonce) and a message integrity code (MIC);
28 The AP uses the ANonce, SNonce and the PMK to construct the PTK. The AP also uses the MIC in order to verify that the STA has computed the correct and fresh key. Furthermore, the AP also generates and installs a Group Temporal Key (GTK, which is used exclusively for the encryption and decryption of broadcast and multicast traffic;
29 The AP sends to the STA an encrypted GTK, a sequence number to use for the next broadcast message and an instruction to install the PTK (the message is integrity protected by another MIC);
The STA responds with an acknowledgement message;
31 The STA installs both the PTK and the GTK and as of this point uses them to encrypt and decrypt all communication;
32 The AP also installs the PTK;
33 The 802.1X Controlled Port is now open and the STA may communicate with other network hosts besides the AP.

As may be understood from the above, the authentication procedure may be lengthy and involve a lot of signalling. STAs that move around in the network will perform re-associations many times. Thus there is room for improvement of the association and re-association procedures.

SUMMARY

It is an object to improve the performance of a wireless communications network.

It is another object to provide a method for assisting a wireless communication device in determining an association procedure towards a network node in a wireless communications network.

It is also an object to provide a method for determining an association procedure towards a network node.

Another object is to provide a method of generating a frame for wireless communication.

Yet another object is to provide an improved Fast Initial Link Setup, FILS, Discovery frame for network signaling in a wireless communication network.

Still another object is to provide a network node configured to assist a wireless communication device in determining an association procedure towards the network node.

It is also an object to provide a wireless device configured to determine an association procedure towards a network node.

Another object is to provide an arrangement configured to generate a frame for wireless communications.

Yet another object is to provide corresponding computer programs and computer-program products.

Still another object is to provide a network node for assisting a wireless communication device in determining an association procedure towards the network node.

It is also an object to provide a wireless device for determining an association procedure towards a network node.

Another object is to provide an arrangement for generating a frame for wireless communication.

These and other objects are met by at least one of the embodiments of the proposed technology.

According to a first aspect, there is provided a method performed by a network node for assisting a wireless communication device in determining an association procedure towards the network node in a wireless communications network. The method comprises:
  sending information to the wireless communication device in a Fast Initial Link Setup, FILS, Discovery frame, which information relates to a Mobility Domain to which the network node belongs, to enable the wireless communication device to determine whether to associate with the network node through a full authentication procedure or through a reduced authentication procedure.

According to a second aspect, there is provided a method performed by a wireless communication device for determining an association procedure towards a network node in a wireless communications network. The method comprises:

receiving information from the network node in a Fast Initial Link Setup, FILS, Discovery frame, which information relates to a Mobility Domain to which the network node belongs, and determining whether to associate with the network node through a full authentication procedure or through a reduced authentication procedure, based on the information relating to the Mobility Domain.

According to a third aspect, there is provided a method of generating a frame for wireless communication, wherein the method comprises:

including Mobility Domain information in a Fast Initial Link Setup, FILS, Discovery frame for network signaling in a wireless communication network.

According to a fourth aspect, there is provided a Fast Initial Link Setup, FILS, Discovery frame for network signaling in a wireless communication network, wherein the FILS Discovery frame includes Mobility Domain information.

According to a fifth aspect, there is provided a network node configured to assist a wireless communication device in determining an association procedure towards the network node in a wireless communications network. The network node is configured to send information to the wireless communication device in a Fast Initial Link Setup, FILS, Discovery frame, which information relates to a Mobility Domain to which the network node belongs, to enable the wireless communication device to determine whether to associate with the network node through a full authentication procedure or through a reduced authentication procedure.

According to a sixth aspect, there is provided a wireless device configured to determine an association procedure towards a network node in a wireless communications network. The wireless device is configured to receive information from the network node in a Fast Initial Link Setup, FILS, Discovery frame, which information relates to a Mobility Domain to which the network node belongs. The wireless device is also configured to determine whether to associate with the network node through a full authentication procedure or through a reduced authentication procedure, based on the information relating to the Mobility Domain.

According to a seventh aspect, there is provided an arrangement configured to generate a frame for wireless communications, wherein the arrangement is configured to include Mobility Domain information in a Fast Initial Link Setup, FILS, Discovery frame for network signaling in a wireless communication network.

According to an eight aspect, there is provided a computer program comprising instructions, which when executed by at least one processor, cause the at least one processor to prepare a Fast Initial Link Setup, FILS, Discovery frame for transmission from a network node to a wireless device by including information relating to a Mobility Domain to which the network node belongs in the FILS Discovery frame, to enable the wireless communication device to determine whether to associate with the network node through a full authentication procedure or through a reduced authentication procedure.

According to a ninth aspect, there is provided a computer program comprising instructions, which when executed by at least one processor, cause the at least one processor to determine whether to associate a wireless communication device with a network node through a full authentication procedure or through a reduced authentication procedure, based on information received from the network node in a Fast Initial Link Setup, FILS, Discovery frame, which information relates to a Mobility Domain to which the network node belongs.

According to a tenth aspect, there is provided a computer program comprising instructions, which when executed by at least one processor, cause the at least one processor to generate a frame for wireless communication by including Mobility Domain information in a Fast Initial Link Setup, FILS, Discovery frame.

According to an eleventh aspect, there is provided a computer-program product comprising a computer-readable medium having stored thereon a computer program as defined above.

According to a twelfth aspect, there is provided a network node for assisting a wireless communication device in determining an association procedure towards the network node in a wireless communications network. The network node comprises a preparation module for preparing a Fast Initial Link Setup, FILS, Discovery frame for transmission to a wireless device by including information relating to a Mobility Domain to which the network node belongs, to enable the wireless communication device to determine whether to associate with the network node through a full authentication procedure or through a reduced authentication procedure.

According to a thirteenth aspect, there is provided a wireless device for determining an association procedure towards a network node in a wireless communications network. The wireless device comprises a determining module for determining whether to associate the wireless communication device with the network node through a full authentication procedure or through a reduced authentication procedure, based on information received from the network node in a Fast Initial Link Setup, FILS, Discovery frame, which information relates to a Mobility Domain to which the network node belongs.

According to a fourteenth aspect, there is provided an arrangement for generating a frame for wireless communication. The arrangement comprises a frame generating module for generating a Fast Initial Link Setup, FILS, Discovery frame by including Mobility Domain information in the FILS Discovery frame.

An advantage of the proposed technology is that the improved FILS Discovery frame enables receiving devices such as wireless terminals or stations to determine whether a reduced and thus faster authentication procedure can be used, hence improving the overall association or re-association procedure.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 6 is a schematic diagram illustrating an example of the frame format of a conventional FILS Discovery Frame.

FIG. 13 is a schematic diagram illustrating an example of an improved FILS Discovery frame according to an embodiment.

FIG. 14 is a schematic diagram illustrating an example of a vendor specific element in a FILS Discovery frame including Mobility Domain information.

DETAILED DESCRIPTION

Throughout the drawings, the same reference designations are used for similar or corresponding elements.

For a better understanding of the proposed technology, it may be useful with a brief overview and analysis with reference to the particular non-limiting context of a Wireless Local Area Network, WLAN.

As part of developing embodiments herein, a problem will first be identified and discussed. Wi-Fi will be used as a non-limiting example of a wireless communications network in which the problem may arise. The terms Wi-Fi and WLAN are used interchangeably herein.

WLAN Fast BSS Transition

Figure 2:
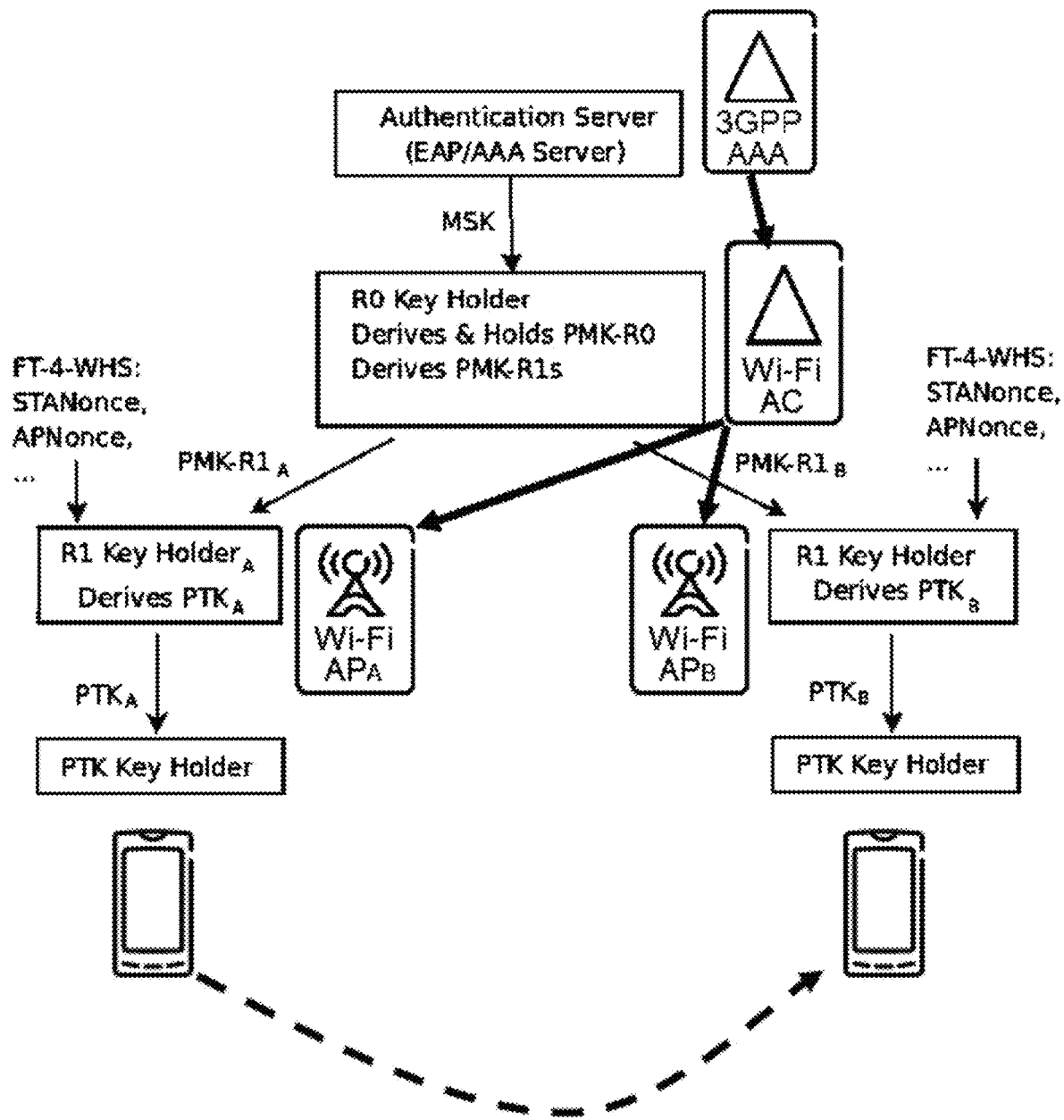
FIG. 2 is a schematic diagram illustrating an example of a network topology for supporting Fast BSS Transition, FT, in a WLAN network.

When an STA is performing transition between APs, it does not necessarily carry the full authentication procedure as described above. One of the 802.11 standard amendments, namely IEEE 802.11r, now part of IEEE 802.11-2012, introduces a Fast BSS Transition, FT, management feature to support seamless handovers between APs. In that way, when an STA performs a handover between different APs that are part of the same mobility domain, it will not need to perform a complete authentication with the target AP, but only renew the over-the-air encryption. An example of the network topology for the Fast BSS Transition scenario is depicted in FIG. 2.

Figure 3:
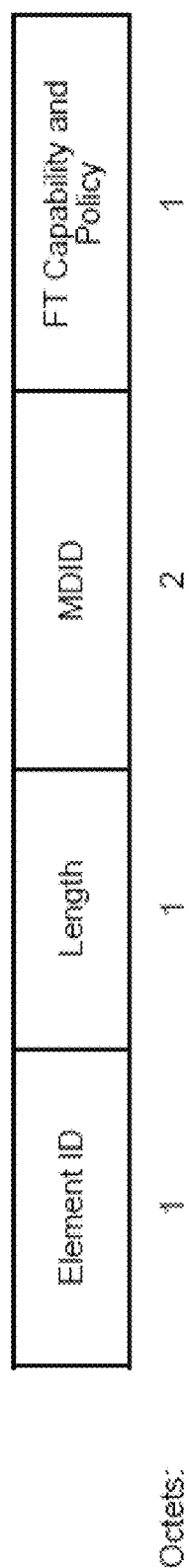
FIG. 3 is a schematic diagram illustrating an example of the format of a Mobility Domain Element.
Figure 4:
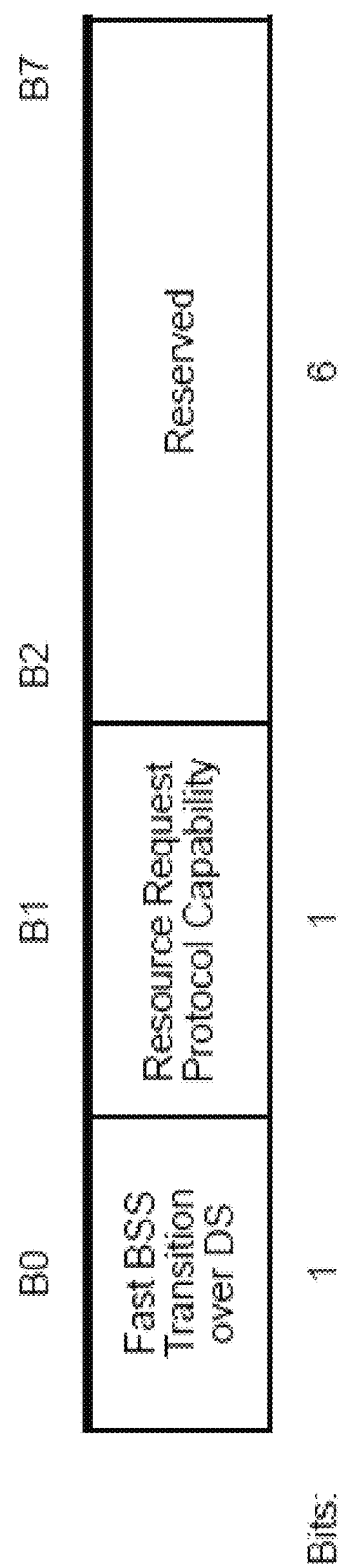
FIG. 4 is a schematic diagram illustrating an example of the FT Capability and Policy field.

The mobility domain information is advertised by the different APs either by broadcast, i.e. in the Beacon frame, or unicast signaling, i.e. in the Probe Response and/or Association/Re-Association Response frames. The exact information element, in which the mobility domain information is comprised in is called the Mobility Domain Element, MDE, and its formatting is depicted in FIG. 3.

Furthermore, the Mobility Domain IDentifier, MDID, is the actual field that carries the unique, i.e. locally unique for a particular network provider and not globally unique, identifier of the mobility domain.

Figure 5:
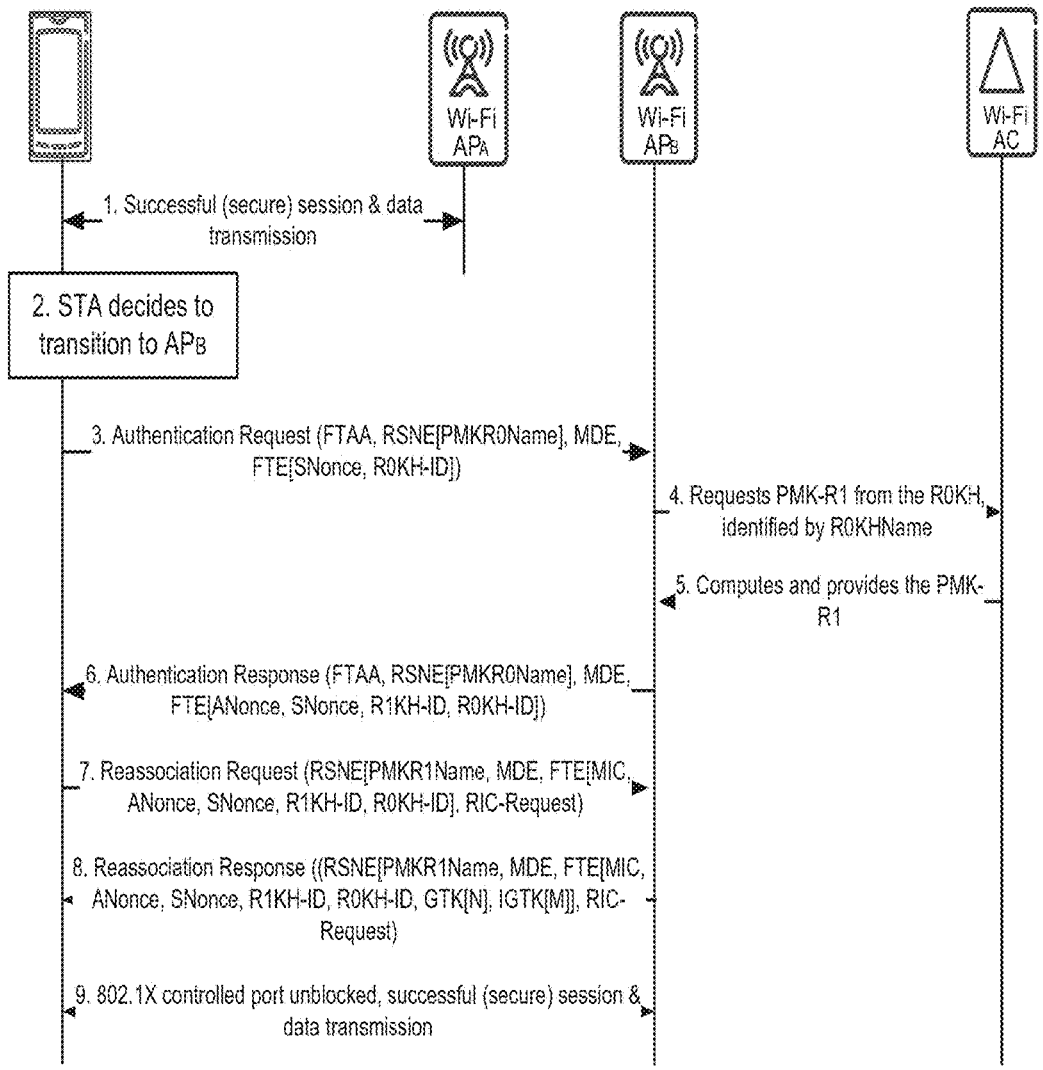
FIG. 5 is a schematic diagram illustrating an example of the process flow for a Fast BSS Transition, FT, procedure.

When an STA performs a fast-BSS transition to another AP, it will not run a complete re-authentication, but will only renew the over-the-air encryption, deriving a fresh PTK with the target AP. A STA that initiates a Fast BSS Transitions procedure is referred to as Fast BSS Transition Originator, FTO. The complete flow for the procedure is shown in FIG. 5. Note that this call only depicts the case when the Fast BSS transition happens in a Robust Secure Network, RSN; for other scenarios, the process calls look differently.

The detailed explanation of the steps is as follows:

1 The STA (FTO) is associated and authenticated to APA (the source AP), successfully transmitting encrypted data;
2 The STA determines that a transition to another AP (APB, the target AP) should be performed. The decision may be based on different metrics, including signal strength, noise level, etc.;
3 The STA sends an Authentication Request to APB, indicating the Fast Transition Authentication Algorithm (FTAA), the RSN Element (RSNE), the Mobility Domain Element (MDE) and the Fast BSS Transition Element (FTE) which carries the Supplicant Nonce (SNonce) and the ROKH-ID. The ROKH-ID associates with the PMK-R0;
4 (OPTIONAL) If APB does not have the PMK-R1, indicated by the STA, it may request it from the ROKH, usually the Access Point Controller (AC). The ROKH from which the key may be fetched is identified by ROKHName, as indicated by the STA in the Authentication Request message from Step 3;
5 (OPTIONAL) The ROKH (AC) provides the PMK-R1;
6 APB then responds with an Authentication Response, indicating the FTAA, the RSNE, the MDE and the FTE, which in this case carries in addition to the SNonce and ROKH-ID also the Authentication Nonce, ANonce, and the R1 KH-ID, associated with the PMK-R1 key. The STA and the APB both compute the new PTK, based on the SNonce, ANonce, PMK-R1 and PMKR1 Name;
7 The STA then re-associates with APB within the allowed Re-association Deadline Time, sending a Re-association Request;
8 APB responds with Re-association Response;
9 The 802.1X controlled port is unblocked and the STA may successfully transmit encrypted data with APB;

Fast Initial Link Setup (FILS)

An amendment to the IEEE 802.11 standard, the Fast Initial Link Setup, FILS, introduces a new broadcast frame, the FILS Discovery frame, also referred to as the FD frame, which is sent more often than the Beacon frame. While the Beacon frame is usually sent every 100 ms, the FD frame may be sent as often as every 20 or even 10 ms. A goal of having the FD frame is to improve and speed up the initial association procedure. However, due to the higher periodicity of the FD frame, its contents are kept to a bare minimum in order to not degrade the over the air performance by introducing too much management traffic. The content of the FD frame is shown in FIG. 6. Examples of extended FILS frames can be found in references [4, 5].

Figure 1:
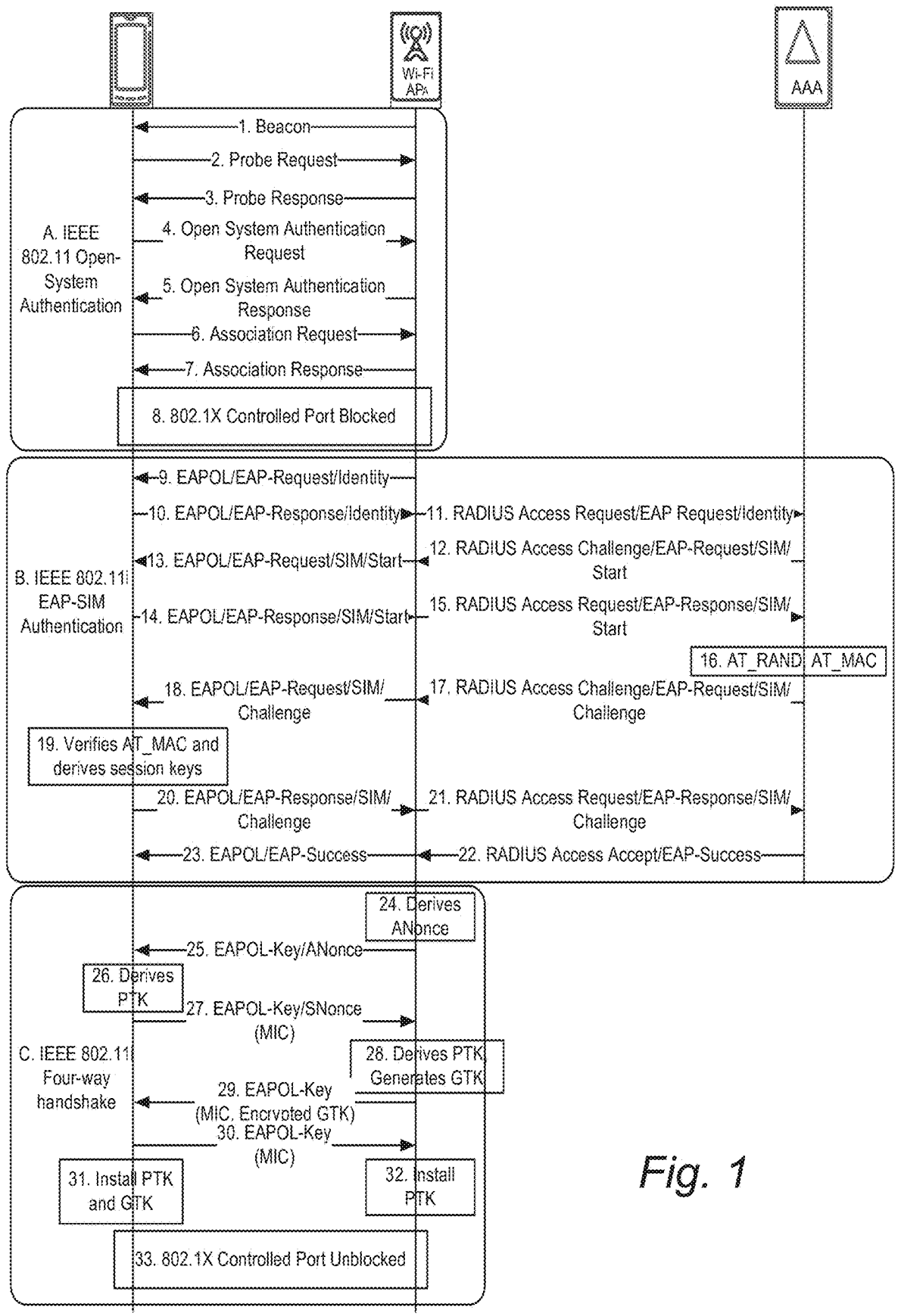
FIG. 1 is a schematic diagram illustrating an example of a conventional WLAN authentication procedure.

The inventors have recognized the possibility of integrating Fast BSS Transition and FILS, and pin-pointed certain opportunities related to these procedures. Once an STA has carried out an initial association to a certain mobility domain, as per the procedure depicted in FIG. 1, it has the opportunity to carry out a Fast BSS Transition, as per the procedure depicted in FIG. 5, when it wants to re-associate with another AP, e.g. a target AP, in the same mobility domain as the AP to which the STA has initially associated to, e.g. a source AP. By performing a Fast BSS Transition, the STA significantly reduces the interruption time and network signaling associated with the AP-to-AP transition.

Figure 7:
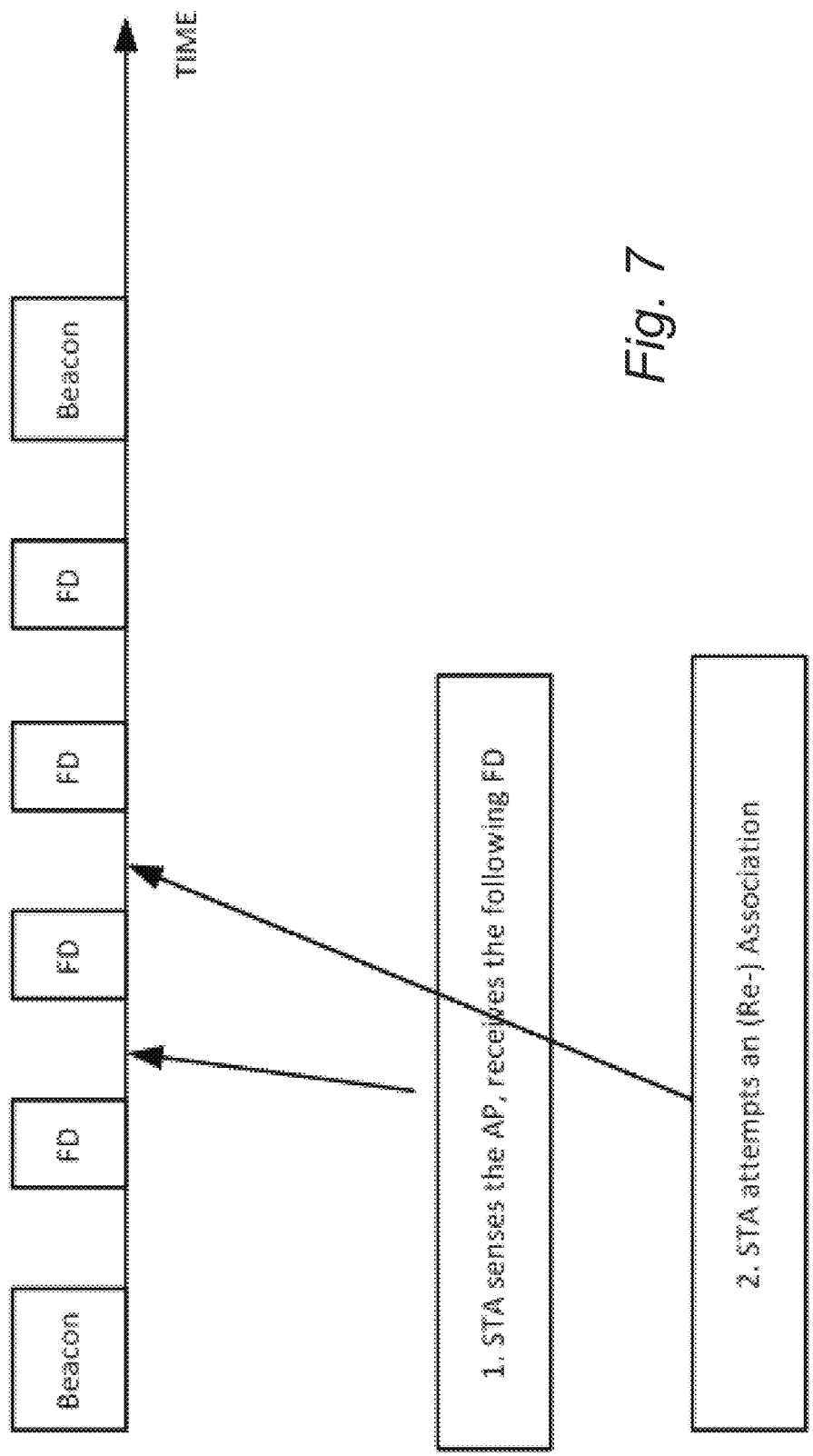
FIG. 7 is a combined signaling and action diagram illustrating an example of signaling and corresponding actions.

Currently, a FILS STA may attempt association with a FILS AP after having received as little as a FD frame as shown in FIG. 7. However, in order for the STA to be able to carry a re-association, it needs to be able to recognize whether the target AP is part of the same mobility domain as the source AP. Since the FD frame sent by a FILS AP does not carry any information with regards to the mobility domain to which said AP belong, the FILS STA has no way of knowing whether or not it may perform a Fast BSS Transition to this AP. In this sense, the FILS STA may need to carry a regular FILS association as opposed to a Fast BSS Transition re-association. This will in some cases generate extra network signaling and impact negatively the transition time.

Embodiments herein amend the information broadcasted by a FILS AP carried in a FILS Discovery frame with information about a mobility domain to which said AP belongs to. In this way, a FILS STA will be fully aware of the mobility domain to which that AP belongs to after having received as little as one FD frame.

According to an aspect of embodiments herein, there is provided a method performed by a network node for assisting a wireless communication device in determining an association procedure towards the network node in a wireless communications network.

The network node sends information to the wireless communication device in a Fast Initial Link Setup, FILS, Discovery frame, which information relates to a mobility domain to which the network node belongs, and which information enables the wireless communication device to determine whether to associate with the network node through a full authentication procedure or through a reduced authentication procedure. Reference can be made to step 901 in FIG. 9.

According to another aspect of embodiments herein, there is provided a network node configured to perform the method above, as will be described in detail later on.

According to yet another aspect of embodiments herein, there is provided a method performed by a wireless communication device for determining an association procedure towards a network node in a wireless communications network.

The wireless communication device receives information from the network node in a Fast Initial Link Setup, FILS, Discovery frame, which information relates to a mobility domain to which the network node belongs. Reference can be made to step 1101 in FIG. 11.

The wireless communication device determines whether to associate with the network node through a full authentication procedure or through a reduced authentication procedure, based on the information relating to the mobility domain. Reference can be made to step 1102 in FIG. 11.

According to still another aspect of embodiments herein, there is provided a wireless communication device configured to perform the method above, as will be described in detail later on.

According to an aspect of embodiments herein, there is provided a method of generating a frame for wireless communication. The method comprises including Mobility Domain information in a Fast Initial Link Setup, FILS, Discovery frame for network signaling in a wireless communication network. Reference can be made to step 1301 in FIG. 15.

According to another aspect of embodiments herein, there is provided an arrangement configured to perform the method above, as will be described in detail later on.

Since the FILS Discovery frame carries information related to the mobility domain to which the network node belongs, the wireless communication device is able to discover whether the reduced authentication procedure is possible or not in a faster and less resource demanding way. This improves the association and/or re-association procedure which results in an improved performance of the wireless communications network.

The wireless communication device significantly reduces the interruption time and the network signaling associated with the re-association procedure, for example when transitioning between a source network node and target network node.

By way of example, the Mobility Domain information includes a Mobility Domain Identifier, MDID, or a Mobility Domain Element, MDE, or a representation thereof.

For example, the Mobility Domain information may include a hashed value of the MDID or MDE.

The Mobility Domain information may for example be introduced as an information element in the FILS Discovery frame.

Optionally, the Mobility Domain information is introduced as a vendor specific element in the FILS Discovery frame.

Alternatively, the Mobility Domain information is included as a field in a FILS Indication element, which is part of the FILS Discovery frame.

In a particular example, the Mobility Domain information enables a wireless communication device to determine whether or not to associate with a network node through a Fast Basic Service Set, BSS, Transition procedure, based on the information about the mobility domain.

In an optional embodiment, the method for assisting a wireless communication device in determining an association procedure also comprises associating with the wireless communication device through a reduced authentication procedure. Reference can be made to the optional (dashed lines) step 902 in FIG. 9.

In another optional embodiment, the method for determining an association procedure also comprises associating with the network node through a reduced authentication procedure. Reference can be made to the optional (dashed lines) step 1103 in FIG. 11.

In a particular example, the reduced authentication procedure comprises actions of a Fast BSS Transition procedure.

By way of example, a mobility domain may be regarded as a set of Basic Service Sets, BSSs, within the same Extended Service Set, ESS, that support Fast BSS Transition, FT, between themselves and that are identified by the set's Mobility Domain Identifier, MDID. Accordingly, a MDID is an example of an identifier that identifies a Mobility Domain.

An FT initial mobility domain association may be seen as a first association or first re-association procedure within a mobility domain, during which a STA indicates its intention to use the FT procedures.

According to an aspect, there is provided a Fast Initial Link Setup, FILS, Discovery frame for network signaling in a wireless communication network, wherein the FILS Discovery frame includes Mobility Domain information.

At least one aspect of the proposed technology thus relates to the procedure of generating a Fast Initial Link Setup, FILS, Discovery frame including Mobility Domain information and/or the exchange of such a frame between a network node and a wireless communication device, e.g. to enable the wireless communication device to determine whether to associate with the network node through a full authentication procedure or through a reduced authentication procedure.

Figure 8:
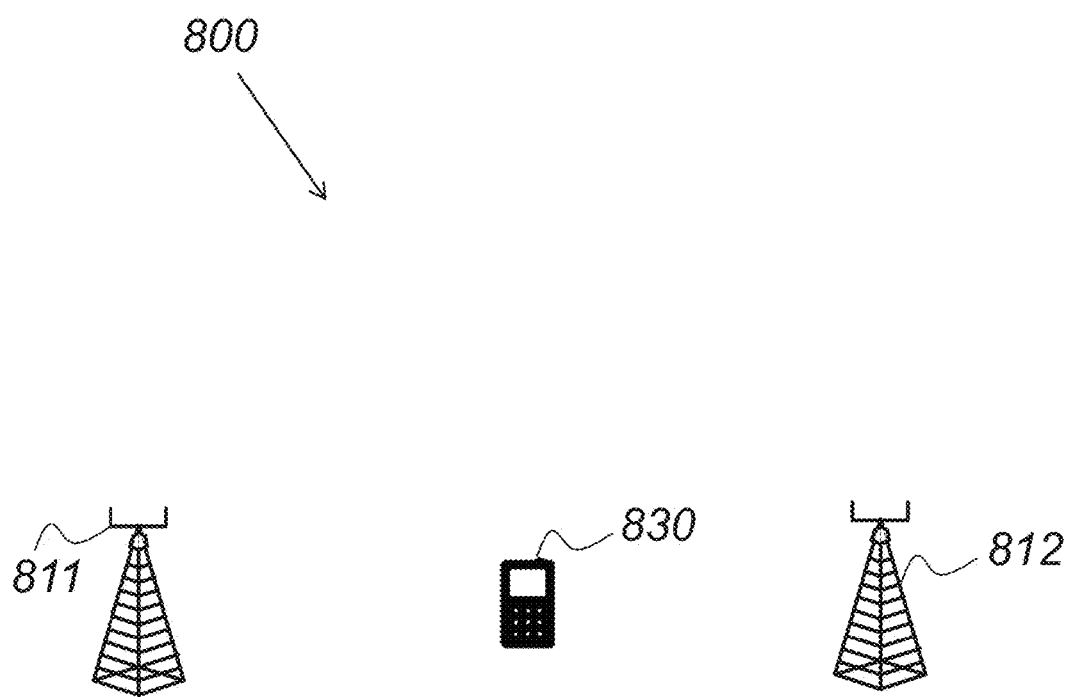
FIG. 8 is a schematic diagram illustrating an example of relevant parts of a wireless communication network.

Embodiments herein may be implemented in one or more wireless communications networks whereof FIG. 8 depicts relevant parts of a wireless communication network 800. The wireless communications network 800 may for example be a WLAN, such as Wi-Fi. Wi-Fi will hereafter be used to exemplify the embodiments.

The wireless communications network 800 comprises a plurality of APs and/or other network nodes. More specifically, the wireless communications network 800 comprises a network node 811, also referred to as a target network node herein. The wireless communications network 800 may comprise a second network node 812, also referred to as a source network node herein.

The term "network node" may correspond to any type of radio network node or any network node, which communicates with at least a radio network node. For example, the network node 811 may be an Access Point, AP, Base Station, Wi-Fi AP, base station router, or any other network unit capable of communicating with a wireless communication device.

Network nodes, such as base stations and Wi-Fi APs, communicate over the air or radio interface operating on radio frequencies with wireless communication devices within range of the network nodes. The wireless communication devices transmit data over the radio interface to network nodes, such base stations and Wi-Fi APs, in uplink, UL, transmissions, and network nodes, such as Wi-Fi APs and base stations, transmit data over an air or radio interface to the wireless communication devices in downlink, DL, transmissions.

In embodiments herein a wireless communication device 830, also referred to as a STA, is within communication range of the network node 811, but has not yet started an authentication procedure towards the network node 811.

In some embodiments, the wireless communication device 830 is in a transition process between the second network node 812 and the first network node 811.

The wireless communication device 830 may further be e.g. a mobile terminal or a wireless terminal, User Equipment, UE, a mobile phone, a computer such as e.g. a laptop, a Personal Digital Assistants, PDAs, or a tablet computer, sometimes referred to as a surf plate, with wireless capability, target device, device to device UE, MTC UE or UE capable of machine to machine communication, iPad, smart phone, Laptop Embedded Equipment, LEE, Laptop Mounted Equipment, LME, USB dongles etc. or any other radio network units capable to communicate over a radio link in a wireless communications network.

Please note that the term User Equipment used herein also covers other wireless communication devices such as machine to machine, M2M, devices, even though they do not have any user.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits, ASICs.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

In the following sections, methods and implementation examples for determining or assisting in determining an association procedure towards the network node 811 in the wireless communications network 800 will be illustrated in more detail by a number of exemplary embodiments. The following embodiments will be described using Wi-Fi as an example and the network node 811 will be an AP.

It should be noted that the following embodiments are not mutually exclusive. Components from one embodiment may be tacitly assumed to be present in another embodiment and it will be obvious to a person skilled in the art how those components may be used in the other exemplary embodiments.

In the following, embodiments related to the network node will be described.

According to an aspect, there is provided a network node configured to assist a wireless communication device in determining an association procedure towards the network node in a wireless communications network.

The network node is configured to send information to the wireless communication device in a Fast Initial Link Setup, FILS, Discovery frame, which information relates to a Mobility Domain to which the network node belongs, to enable the wireless communication device to determine whether to associate with the network node through a full authentication procedure or through a reduced authentication procedure. By way of example, the network node may be configured to send Mobility Domain information including a Mobility Domain Identifier, MDID, or a Mobility Domain Element, MDE, or a representation thereof.

For example, the network node may be configured to send Mobility Domain information as an information element in the FILS Discovery frame.

In a particular example, the network node is configured to send Mobility Domain information to enable the wireless communication device to determine whether or not to associate with the network node through a Fast Basic Service Set, BSS, Transition procedure, based on the information about the mobility domain.

In an optional embodiment, the network node may be configured associate with the wireless communications device through a reduced authentication procedure.

As an example, the network node may be configured associate with the wireless communications device through a Fast Basic Service Set, BSS, Transition procedure.

Figure 9:
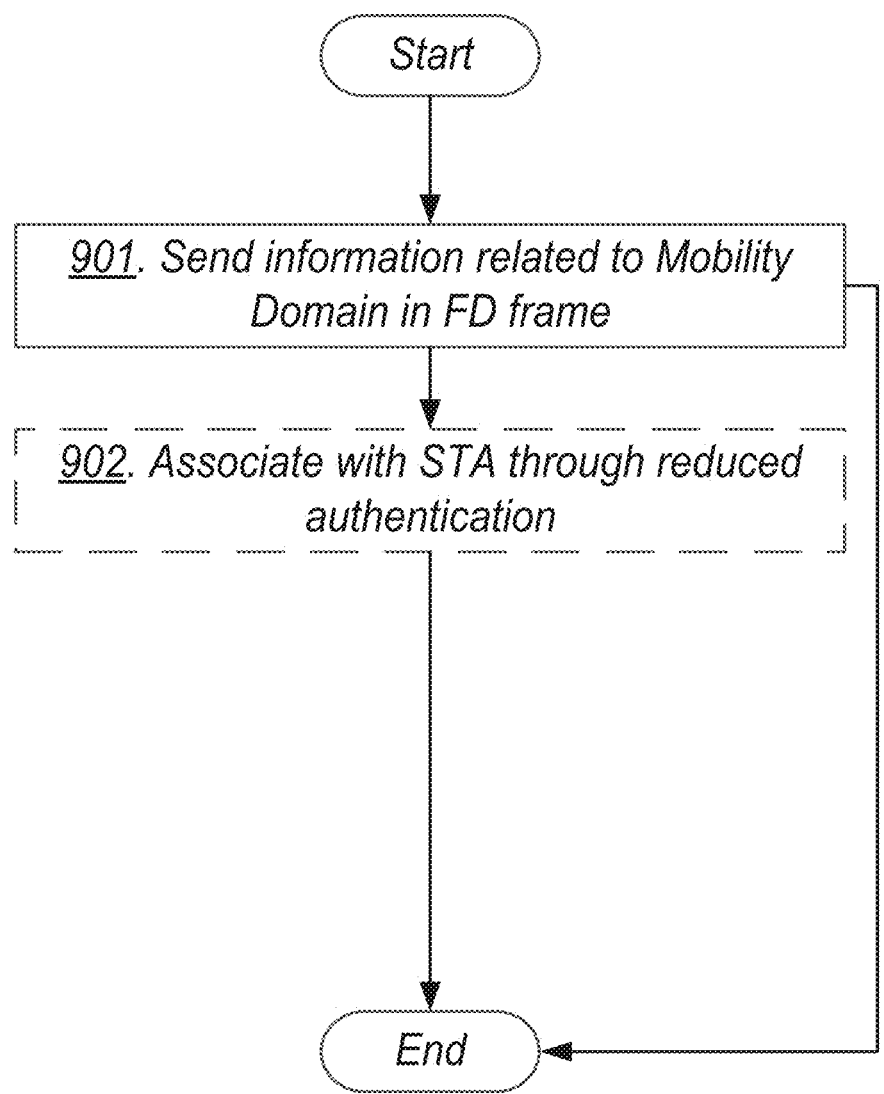
FIG. 9 is a schematic flow diagram illustrating an example of a method for assisting a wireless communication device in determining an association procedure towards the network node in a wireless communications network according to an embodiment.

Illustrative examples of the network node 811 embodiments are described with reference to FIGS. 9 and 10.

According to an aspect of embodiments herein, there is provided a method performed by the network node 811 for assisting the wireless communication device 830 in determining an association procedure towards the network node 811 in the wireless communications network 800.

The network node 811 may:
- send 901 in a Fast Initial Link Setup, FILS, Discovery frame, information to the wireless communication device, which information relates to a mobility domain to which the network node belongs. The information enables the wireless communication device to determine whether or not to associate with the network node through a Fast Basic Service Set, BSS, Transition procedure, based on the information about the mobility domain, and
- associate (optional) 902 with the wireless communications device 830 through a reduced authentication procedure. The reduced authentication procedure may comprise the actions described above in relation to the WLAN Fast BSS Transition.

In a particular example, the network node 811 comprises a processor 1080 and a memory 1090, the memory comprising instructions executable by the processor, whereby the processor is operative to assist the wireless communication device in determining an association procedure towards the network node.

The action in step 901 may be performed by means such as a sending module 1010 in the network node 811. The sending module 1010 may be implemented by any one or more out of a transmitter and a processor 1080 in the network node 811.

The action in step 902 may be performed by means such as an associating module 1020 in the network node 811. The associating module 1020 may be implemented by the processor 1080 in the network node 811.

In the following, embodiments related to the wireless communication device will be described.

According to an aspect, there is provided a wireless device configured to determine an association procedure towards a network node in a wireless communications network.

The wireless device is configured to receive information from the network node in a Fast Initial Link Setup, FILS, Discovery frame, which information relates to a Mobility Domain to which the network node belongs.

The wireless device is also configured to determine whether to associate with the network node through a full authentication procedure or through a reduced authentication procedure, based on the information relating to the Mobility Domain.

By way of example, the wireless device may be configured to receive Mobility Domain information including a Mobility Domain Identifier, MDID, or a Mobility Domain Element, MDE, or a representation thereof.

For example, the wireless device may be configured to receive Mobility Domain information as an information element in the FILS Discovery frame.

In a particular example, the wireless device is configured to receive Mobility Domain information to enable the wireless communication device to determine whether or not to associate with the network node through a Fast Basic Service Set, BSS, Transition procedure, based on the information about the mobility domain.

In an optional embodiment, the wireless device is configured to associate with the network node through a reduced authentication procedure.

For example, the wireless device may be configured to associate with the network node through a Fast Basic Service Set, BSS, Transition procedure.

Figure 11:
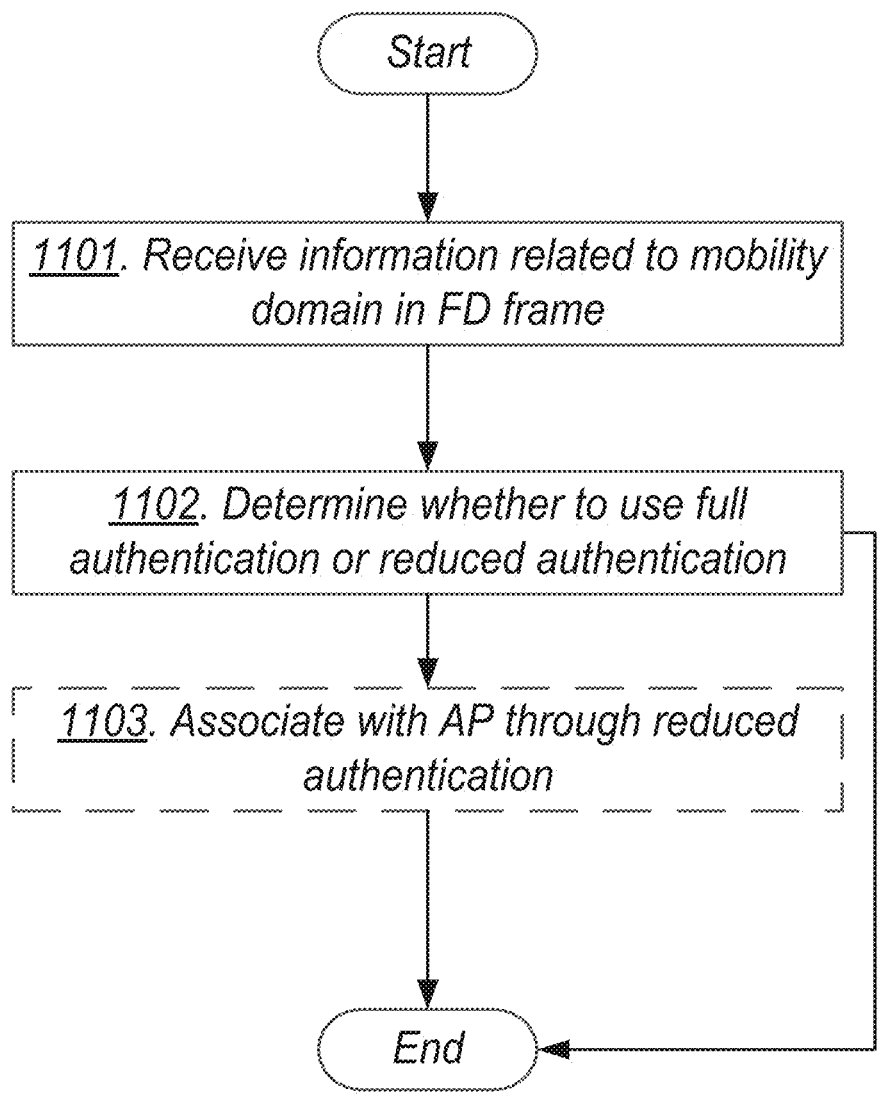
FIG. 11 is a schematic flow diagram illustrating an example of a method for determining an association procedure towards a network node in a wireless communications network according to an embodiment.

Illustrative examples of the wireless communication device 830 embodiments are described with reference to FIGS. 11 and 12.

According to an aspect of embodiments herein, there is provided a method performed by the wireless communication device 830 for determining an association procedure towards the network node 811 in the wireless communications network 800.

The wireless communication device 830 may:
- receive 1101 an information about a mobility domain to which the network node belongs in a Fast Initial Link Setup, FILS, Discovery frame from the network node 811;
- determine 1102 whether or not to associate with the network node 811 through a Fast Basic Service Set, BSS, Transition procedure, based on the information about the mobility domain; and
- associate (optional) 1103 with the network node 811 through a reduced authentication procedure. The reduced authentication procedure may comprise the actions described above in relation to the WLAN Fast BSS Transition.

In a particular example, the wireless device 830 comprises a processor 1280 and a memory 1290, the memory comprising instructions executable by the processor, whereby the processor is operative to determine an association procedure towards a network node.

The action in step 1101 may be performed by means such as a receiving module 1210 in the wireless communication device 830. The receiving module 710 may be implemented by any one or more out of a transmitter and a processor 1280 in the wireless communication device 830.

The action in step 1102 may be performed by means such as a determining module 1220 in the wireless communication device 830. The determining module 1220 may be implemented by the processor 1280 in the wireless communication device 830.

The action in step 1103 may be performed by means such as an associating module 1230 in the network node 811. The associating module 1230 may be implemented by the processor 1280 in the network node 811.

Embodiments herein may be performed in the network node 811. The network node 811 may comprise the modules mentioned above and depicted in FIG. 10 for handling the connection.

Embodiments herein may be performed in the wireless communication device 830. The wireless communication device 830 may comprise the modules mentioned above and depicted in FIG. 12 for handling the connection.

In the following, embodiments related to an arrangement configured to determine a frame for wireless communication will be described.

According to an aspect, there is provided an arrangement configured to generate a frame for wireless communication. The arrangement is configured to include Mobility Domain information in a Fast Initial Link Setup, FILS, Discovery frame for network signaling in a wireless communication network.

By way of example, the arrangement is configured to include a Mobility Domain Identifier, MDID, or a Mobility Domain Element, MDE, or a representation thereof in the FILS Discovery frame.

For example, the arrangement may be configured to introduce the Mobility Domain information as an information element in the FILS Discovery frame.

In a particular example, the Mobility Domain information enables a wireless communication device to determine whether or not to associate with a network node through a Fast Basic Service Set, BSS, Transition procedure, based on the information about the mobility domain.

Figure 15:
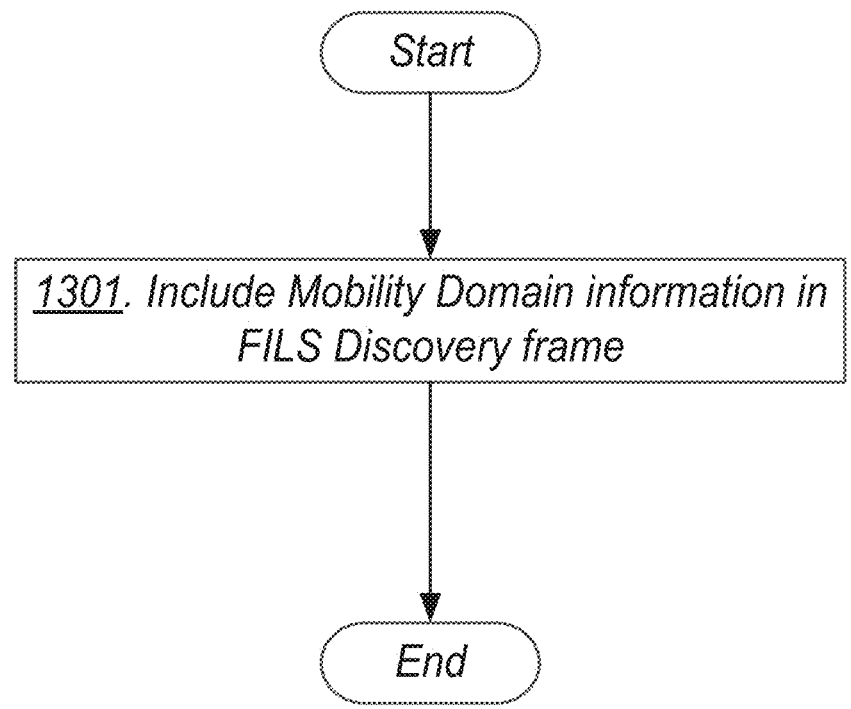
FIG. 15 is a schematic flow diagram illustrating an example of a method for generating a frame for wireless communication according to an embodiment.
Figure 16:
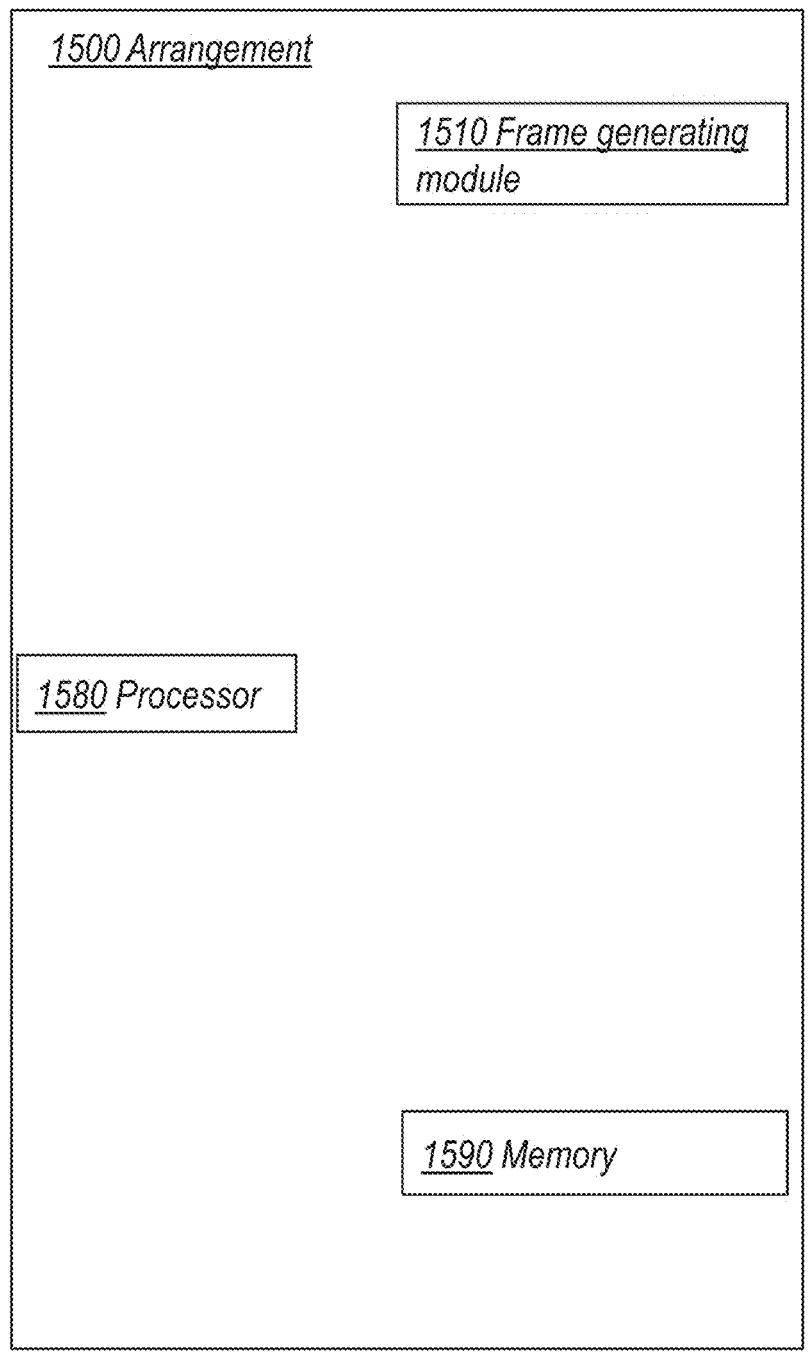
FIG. 16 is a schematic block diagram illustrating implementation examples of an arrangement according to an embodiment.

Illustrative examples of an arrangement are described with reference to FIGS. 15 and 16.

According to an aspect of embodiments herein, there is provided a method of generating a frame for wireless communication.

The arrangement 1500 may:
include 1301 Mobility Domain information in a Fast Initial Link Setup, FILS, Discovery frame for network signaling in a wireless communication network.

In a particular example, the arrangement 1500 comprises a processor 1580 and a memory 1590, the memory comprising instructions executable by the processor, whereby the processor is operative to generate a FILS Discovery frame.

The action in step 1301 may be performed by means such as a frame generating module 1510 in the arrangement 1500. The frame generating module 1510 may for example be implemented by the processor 1580.

With reference once again to FIG. 10, it should be understood that the processor 1080 and the memory 1090 of the network node 811 may be regarded as an arrangement equivalent to the one described in connection with FIG. 16 above.

The flow diagrams presented herein may be regarded as computer flow diagrams, when performed by one or more processors. A corresponding network node, wireless device or similar arrangement may thus be defined as a group of function modules, where each step performed by the processor corresponds to a function module. The computer program residing in memory may thus be organized as appropriate function modules configured to perform, when executed by the processor, at least part of the steps and/or tasks described herein.

With reference once again to FIG. 10, there is provided a network node for assisting a wireless communication device in determining an association procedure towards the network node in a wireless communications network. The network node 811 comprises a preparation module 1005 for preparing a Fast Initial Link Setup, FILS, Discovery frame for transmission to a wireless device by including information relating to a Mobility Domain to which the network node belongs, to enable the wireless communication device to determine whether to associate with the network node through a full authentication procedure or through a reduced authentication procedure.

With reference once again to FIG. 12, there is provided a wireless device for determining an association procedure towards a network node in a wireless communications network. The wireless device 830 comprises a determining module 1220 for determining whether to associate the wireless communication device with the network node through a full authentication procedure or through a reduced authentication procedure, based on information received from the network node in a Fast Initial Link Setup, FILS, Discovery frame, which information relates to a Mobility Domain to which the network node belongs.

With reference once again to FIG. 16, there is provided an arrangement for generating a frame for wireless communication. The arrangement 1500 comprises a frame generating module 1510 for generating a Fast Initial Link Setup, FILS, Discovery frame by including Mobility Domain information in the FILS Discovery frame.

Alternatively, the function modules are implemented predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits, ASICs, as previously mentioned. Other examples of usable hardware include input/output, I/O, circuitry and/or circuitry for receiving and/or sending signals. The extent of software versus hardware is purely implementation selection.

Some embodiments will now be described in more detail.

Embodiment 1

In one embodiment, mobility domain information is included in the FILS Discovery, FD, frame. One option is for the mobility domain information to be introduced as a new information element in the FILS Discovery frame. An example of a resulting FILS Discovery frame is shown in FIG. 13.

Accordingly, with reference to the example of FIG. 13, there is provided a Fast Initial Link Setup, FILS, Discovery frame 1400 for network signaling in a wireless communication network, wherein the FILS Discovery frame includes Mobility Domain information 1401.

Another option is to introduce the mobility domain information as a vendor specific element in the FILS Discovery frame.

In this case, the vendor specific element may be formatted according to the WFA's instructions and policies for formatting of vendor specific elements introduced in Wi-Fi Alliance programs. An example of an element formatting is shown in FIG. 14.

The fields in FIG. 14 have the following meaning:
The Element ID is a 1-octet field whose value is set to 221, the value for vendor specific information elements.
The Length field is a 1-octet field that indicates the length of the Mobility Domain information field plus the length of the OI and Type fields.
The OI is a 3-octet field. As used by the Wi-Fi Alliance, the content of the OI field is set to the value 0x 50 6F 9A.
The Type field is a 1-octet field set to the value 0x10.

The Mobility Domain information field carries information regarding the mobility domain to which a certain FILS AP belongs. Several options of the exact information are given in the later embodiments.

Embodiment 2

In another embodiment, related to embodiment 1, the mobility domain information is the complete Mobility Domain Element, MDE. This would imply that the FD frame would include the MDE as another element in the list of currently present elements. An alternative to this is for the mobility domain information to carry only the Mobility Domain Identifier, MDID, field, which is one of the fields contained in the MDE. This would imply that the FD frame may include the MDID as another field or element to the list of currently existing fields and elements. In the latter proposal, there are only 2 octets added to the FD frame as opposed to 5 octets if the entire MDE is included.

Embodiment 3

In another embodiment, related to embodiment 1 and 2, the mobility domain information which is added to the FD frame is a hashed value of either the MDE or the MDID, as per the two options described in embodiment 2. A hash function is any function that may be used to map digital data of arbitrary size to digital data of fixed size. The values returned by a hash function are called hash values, hash codes, hash sums, or simply hashes.

There are several benefits of using a hashed value and one of them is the reduction in the size of the MDE and MDID in the hashing procedure. The reduced size implies a smaller amount of information that is added to the FD frame and eventually transmitted over the air. This further improves the performance of the network node 811 and the wireless communication device 830.

Embodiment 4

In another embodiment, related to embodiment 1, the mobility domain information is included as a new field in the FILS Indication element. The FILS information element is part of the FD frame. Also in this case there are several options available in terms of which information to include. In one option, the MDE will be included in the FILS Indication element. In another option, the MDID only will be included in the FILS Indication element. Furthermore, instead of including the entire MDE or MDID, there is a possibility to include hashed versions of any of them.

Since the FILS Discovery frame carries information about the mobility domain to which a FILS AP belongs, the wireless communication device 830, such as a FILS STA, is able to discover whether Fast BSS Transition to the network node 811, such as a FILS AP, is possible or not. This improves the association and/or re-association procedure between the wireless communication device 830 and the network node 811.

Figure 10:
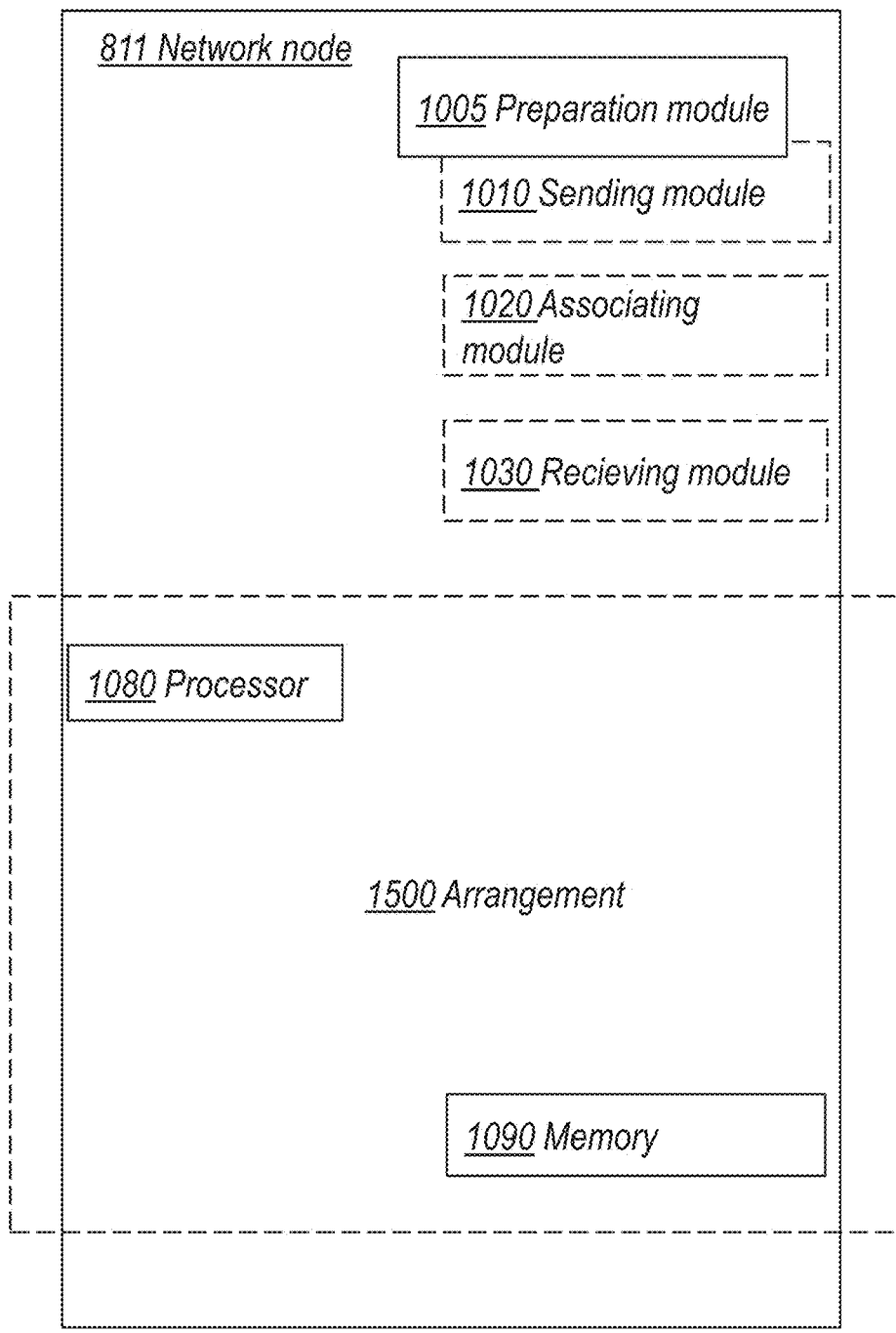
FIG. 10 is a schematic block diagram illustrating implementation examples of a network node.
Figure 12:
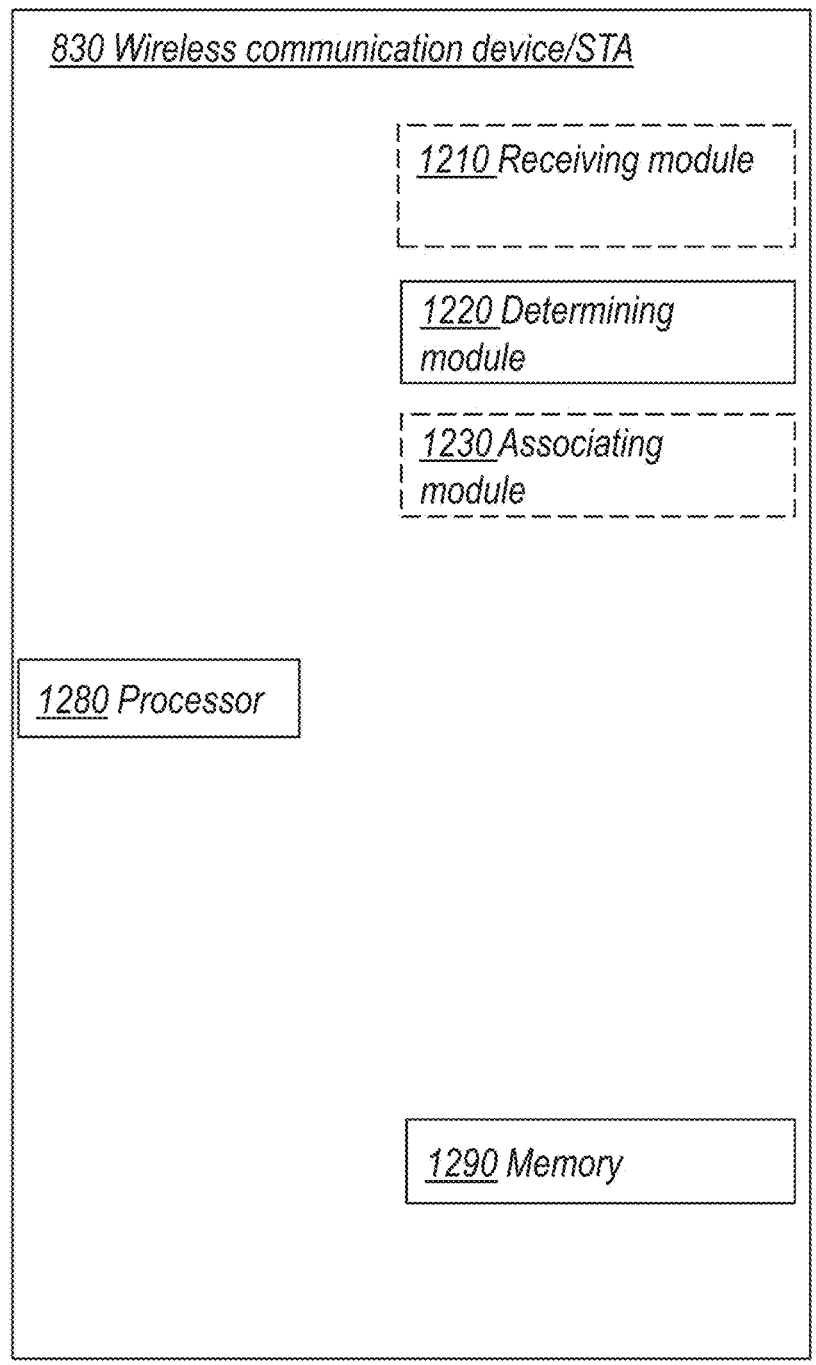
FIG. 12 is a schematic block diagram illustrating implementation examples of a wireless communication device according to an embodiment.

As already mentioned, embodiments herein may be implemented through one or more processors, such as the processor 1080 in the network node 811 depicted in FIG. 10, and the processor 1280 in the wireless communication device 830 depicted in FIG. 12 together with computer program code for performing the functions and actions of the embodiments herein. The program code mentioned above may also be provided as a computer program product, for instance in the form of a data carrier carrying computer program code for performing the embodiments herein when being loaded into the network node 811 and the UE 830. One such carrier may be in the form of a CD ROM disc. It is however feasible with other data carriers such as a memory stick. The computer program code may furthermore be provided as program code on a server and downloaded to the network node 811 and wireless communication device 830.

Thus, the methods according to the embodiments described herein for the network node 811 and the wireless communication device 830 may be implemented by means of a computer program product, comprising instructions, i.e., software code portions, which, when executed on at least one processor, cause the at least one processor to carry out the actions described herein, as performed by the network node 811 and wireless communication device 830.

The computer program product may be stored on a computer-readable storage medium. The computer-readable storage medium, having stored there on the computer program, may comprise the instructions which, when executed on at least one processor, cause the at least one processor to carry out the actions described herein, as performed by the network node 811 and the wireless communication device 830. In some embodiments, the computer-readable storage medium may be a non-transitory computer-readable storage medium.

The network node 811 and the wireless communication device 830 may further each comprise a memory 1090, 1290, comprising one or more memory units. The memory 1090, 1290 is arranged to be used to store obtained information such as information in Information Elements, information related to mobility domain, identities and applications etc. to perform the methods herein when being executed in the network node 811, and the wireless communication device 830.

Those skilled in the art will also appreciate that the different modules described above may refer to a combination of analog and digital circuits, and/or one or more processors configured with software and/or firmware, e.g. stored in the memory, that when executed by the one or more processors, such as the processors in the network node 811 and the wireless communication device 830 perform as described above. One or more of these processors, as well as the other digital hardware, may be included in an Application-Specific Integrated Circuit, ASIC, or several processors and various digital hardware may be distributed among several separate components, whether individually packaged or assembled into a System-on-a-Chip, SoC.

Figure 17:
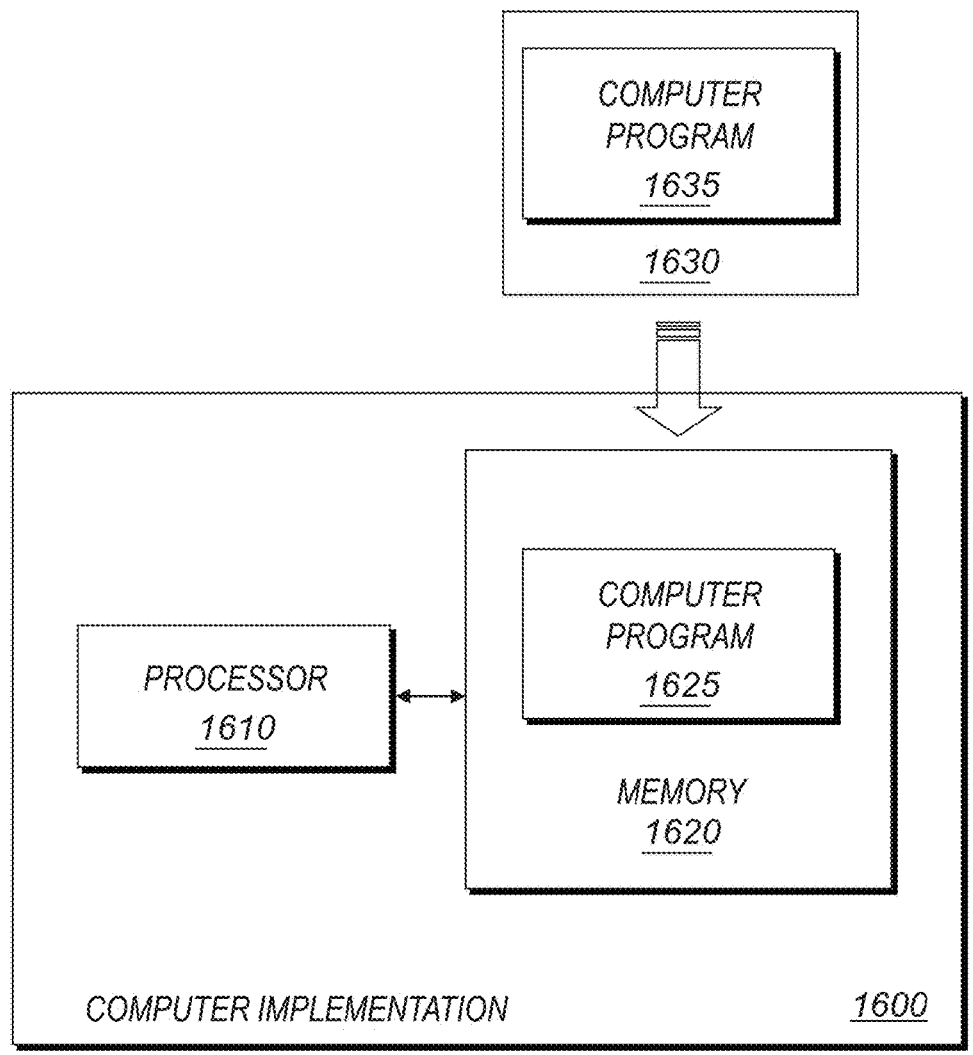
FIG. 17 is a schematic diagram illustrating an example of a computer implementation according to an embodiment.

FIG. 17 is a schematic diagram illustrating an example of a computer implementation according to an embodiment.

In this particular example, at least some of the steps, functions, procedures, modules and/or blocks described herein are implemented in a computer program 1625; 1635, which is loaded from an external carrier 1630 into the memory 1620 for execution by processing circuitry including one or more processors 1610. The processor(s) 1610 and memory 1620 are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular example, there is provided a computer program comprising instructions, which when executed by at least one processor, cause the at least one processor to prepare a Fast Initial Link Setup, FILS, Discovery frame for transmission from a network node to a wireless device by including information relating to a Mobility Domain to which the network node belongs in the FILS Discovery frame, to enable the wireless communication device to determine whether to associate with the network node through a full authentication procedure or through a reduced authentication procedure.

In another example, there is provided a computer program comprising instructions, which when executed by at least one processor, cause the at least one processor to determine whether to associate a wireless communication device with a network node through a full authentication procedure or through a reduced authentication procedure, based on information received from the network node in a Fast Initial Link Setup, FILS, Discovery frame, which information relates to a Mobility Domain to which the network node belongs.

In yet another example, there is provided a computer program comprising instructions, which when executed by at least one processor, cause the at least one processor to generate a frame for wireless communication by including Mobility Domain information in a Fast Initial Link Setup, FILS, Discovery frame.

The proposed technology also provides a carrier comprising any of the computer programs described herein, wherein the carrier is one of an electronic signal, an optical signal, an electromagnetic signal, a magnetic signal, an electric signal, a radio signal, a microwave signal, or a computer-readable storage medium.

By way of example, the software or computer program 1625; 1635 may be realized as a computer program product, which is normally carried or stored on a computer-readable medium 1620; 1630, in particular a non-volatile medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Blu-ray disc, a Universal Serial Bus, USB, memory, a Hard Disk Drive, HDD, storage device, a flash memory, a magnetic tape, or any other conventional memory device.

For example, the computer program may thus be loaded from an external carrier 1630 into a computer-internal carrier such as the operating memory 1620 of a computer or equivalent processing device for execution by the processor(s) 1610 thereof. When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope.

REFERENCES

[1] IEEE 802.11-2012, Chapter 8.3.3.2.
[2] RFC 4186, Chapter 7 and chapter 10.2.
[3] RFC 3579
[4] US 2014/010223
[5] US 2013/230035

The invention claimed is:

1. A method performed by a network node in a wireless communications network for assisting receiving wireless communication devices in determining an association procedure towards the network node, wherein the method comprises:
   sending a Fast Initial Link Setup (FILS) Discovery frame, comprising information identifying a Mobility Domain to which the network node belongs, wherein the Mobility Domain comprises a plurality of basic service sets (BSS) that support a reduced authentication procedure among said plurality of BSS, said information identifying the Mobility Domain enabling receiving wireless communication devices to determine whether to associate with the network node through a full authentication procedure or through the reduced authentication procedure without receiving other types of frames transmitted by the network node; and
   associating with a particular wireless communication device through the reduced authentication procedure wherein, prior to associating with the network node, the particular wireless communication device was associated with the Mobility Domain to which the network node belongs,
   wherein the reduced authentication procedure comprises a Fast BSS Transition procedure.

2. A method performed by a wireless communication device for determining an association procedure towards a network node in a wireless communications network, wherein the method comprises:
   receiving, from the network node in a Fast Initial Link Setup (FILS) Discovery frame, information identifying a Mobility Domain to which the network node belongs, wherein the Mobility Domain comprises a plurality of basic service sets (BSS) that support a reduced authentication procedure among said plurality of BSS;
   determining whether to associate with the network node through a full authentication procedure or through the reduced authentication procedure, based on the received information identifying the Mobility Domain and without receiving other types of frames transmitted by the network node; and
   associating with the network node through the reduced authentication procedure wherein, prior to associating with the network node, the wireless communication device was associated with the Mobility Domain to which the network node belongs,
   wherein the reduced authentication procedure comprises a Fast BSS Transition procedure.

3. The method of claim 1, wherein the Mobility Domain information includes at least one of a Mobility Domain Identifier (MDID), a Mobility Domain Element (MDE), a hashed MDID, and a hashed MDE.

4. The method of claim 1, wherein the Mobility Domain information is introduced as an information element in the FILS Discovery frame.

5. The method of claim 1, wherein the Mobility Domain information is introduced as a vendor specific element in the FILS Discovery frame.

6. The method of claim 1, wherein the Mobility Domain information is included as a field in a FILS Indication element comprising the FILS Discovery frame.

7. The method of claim 1, wherein the method also comprises associating with the particular wireless communication device through a full authentication procedure if, prior to associating with the network node, the particular wireless communication device was not associated with the Mobility Domain to which the network node belongs.

8. The method of claim 2, wherein the method also comprises associating with the network node through a full authentication procedure if, prior to associating with the network node, the wireless communication device was not associated with the Mobility Domain to which the network node belongs.

9. A network node, in a wireless communications network, configured to assist receiving wireless communication devices in determining an association procedure towards the network node, the network node comprising:
 a transceiver circuit; and
 at least one processing circuit coupled to the transceiver circuit and operable to:
 send a Fast Initial Link Setup (FILS) Discovery frame comprising information identifying a Mobility Domain to which the network node belongs, wherein the Mobility Domain comprises a plurality of basic service sets (BSS) that support a reduced authentication procedure among said plurality of BSS, said information identifying the Mobility Domain enabling receiving wireless communication devices to determine whether to associate with the network node through a full authentication procedure or through the reduced authentication procedure without receiving other types of frames transmitted by the network node; and
 associate with a particular wireless communication device through the reduced authentication procedure wherein, prior to associating with the network node, the particular wireless communication device was associated with the Mobility Domain to which the network node belongs,
 wherein the reduced authentication procedure comprises a Fast BSS Transition procedure.

10. The network node of claim 9, wherein the Mobility Domain information includes at least one of a Mobility Domain Identifier (MDID), a Mobility Domain Element (MDE), a hashed MDID, and a hashed MDE.

11. The network node of claim 9, wherein the network node is configured to send Mobility Domain information as an information element in the FILS Discovery frame.

12. The network node of claim 9, wherein the network node is configured to associate with the particular wireless communication device through a full authentication procedure if, prior to associating with the network node, the particular wireless communication device was not associated with the Mobility Domain to which the network node belongs.

13. The network node of claim 9, wherein the at least one processing circuit comprises at least one processor and at least one memory comprising instructions executable by the at least one processor.

14. A wireless device configured to determine an association procedure towards a network node in a wireless communications network, the wireless device comprising:
 a transceiver circuit; and
 at least one processing circuit coupled to the transceiver circuit and operable to:
 receive, in a Fast Initial Link Setup (FILS) Discovery frame, information identifying a Mobility Domain to which the network node belongs, wherein the Mobility Domain comprises a plurality of basic service sets (BSS) that support a reduced authentication procedure among said plurality of BSS;
 determine whether to associate with the network node through a full authentication procedure or through the reduced authentication procedure, based on the received information identifying the Mobility Domain and without receiving other types of frames transmitted by the network node; and
 associate with the network node through the reduced authentication procedure wherein, prior to associating with the network node, the wireless device was associated with the Mobility Domain to which the network node belongs,
 wherein the reduced authentication procedure comprises a Fast BSS Transition procedure.

15. The wireless device of claim 14, wherein the Mobility Domain information comprises at least one of: a Mobility Domain Identifier (MDID), a Mobility Domain Element (MDF), a representation thereof.

16. The wireless device of claim 14, wherein the processing circuit is further operable to receive Mobility Domain information as an information element in the FILS Discovery frame.

17. The wireless device of claim 14, wherein the processing circuit is further operable to associate with the network node through a full authentication procedure if, prior to associating with the network node, the wireless communication device was not associated with the Mobility Domain to which the network node belongs.

18. The wireless device of claim 14, wherein the at least one processing circuit comprises at least one processor and at least one memory comprising instructions executable by the at least one processor.

19. A non-transitory computer-readable medium comprising, stored thereupon, a computer program comprising instructions that, when executed by at least one processor, configure a network node in a wireless communication network to assist wireless communication devices in determining an association procedure toward the network node by:
 sending a Fast Initial Link Setup (FILS) Discovery frame, comprising information identifying a Mobility Domain to which the network node belongs, wherein the Mobility Domain comprises a plurality of basic service sets (BSS) that support a reduced authentication procedure among said plurality of BSS, said information identifying the Mobility Domain enabling receiving wireless communication devices to determine whether to associate with the network node through a full authentication procedure or through the reduced authentication procedure without receiving other types of frames transmitted by the network node; and
 associating with a particular wireless communication device through the reduced authentication procedure wherein, prior to associating with the network node, the particular wireless communication device was associated with the Mobility Domain to which the network node belongs,
 wherein the reduced authentication procedure comprises a Fast BSS Transition procedure.

20. A non-transitory computer-readable medium comprising, stored thereupon, a computer program comprising instructions that, when executed by at least one processor, configures a wireless device to determine an association procedure towards a network node in a wireless communications network by:
 receiving, from the network node in a Fast Initial Link Setup (FILS) Discovery frame, information identifying a Mobility Domain to which the network node belongs, wherein the Mobility Domain comprises a plurality of basic service sets (BSS) that support a reduced authentication procedure among said plurality of BSS;

determining whether to associate with the network node through a full authentication procedure or through the reduced authentication procedure, based on the received information identifying the Mobility Domain and without receiving other types of frames transmitted by the network node; and associating with the network node through the reduced authentication procedure wherein, prior to associating with the network node, the wireless communication device was associated with the Mobility Domain to which the network node belongs, wherein the reduced authentication procedure comprises a Fast BSS Transition procedure.

* * * * *

UNITED STATES PATENT AND TRADEMARK OFFICE
CERTIFICATE OF CORRECTION

PATENT NO. : 10,499,440 B2
APPLICATION NO. : 14/655273
DATED : December 3, 2019
INVENTOR(S) : Mestanov et al.

Page 1 of 1

It is certified that error appears in the above-identified patent and that said Letters Patent is hereby corrected as shown below:

In the Specification

In Column 3, Line 52, delete "The" and insert -- 25 The --, therefor.

In Column 3, Line 65, delete "(GTK," and insert -- (GTK), --, therefor.

In Column 4, Line 5, delete "The" and insert -- 30 The --, therefor.

In the Claims

In Column 22, Line 17, in Claim 15, delete "(MDF)," and insert -- (MDE), --, therefor.

Signed and Sealed this
Twelfth Day of May, 2020

Andrei Iancu
*Director of the United States Patent and Trademark Office*